[19] United States Patent  
Cleveland

[11] Patent Number: 5,537,772  
[45] Date of Patent: Jul. 23, 1996

[54] FLY TYING VISE

[76] Inventor: Kevin C. Cleveland, P.O. Box 1401, Rathdrum, Id. 83858

[21] Appl. No.: 352,913

[22] Filed: Dec. 9, 1994

[51] Int. Cl.⁶ .................................................. A01K 85/00
[52] U.S. Cl. ................................................................ 43/1
[58] Field of Search ........................ 43/1, 4; 289/17; 242/7.01, 7.19, 7.14; 269/97, 254 CS

[56] References Cited

U.S. PATENT DOCUMENTS

| 2,236,781 | 4/1941 | Pannier | 43/1 |
| 2,486,142 | 10/1949 | Fong | 43/1 |
| 2,586,636 | 2/1952 | Fischer | 269/97 |
| 2,624,957 | 1/1953 | Collins | 289/17 |
| 4,169,562 | 10/1979 | Renzetti | 242/7.01 |
| 4,184,645 | 1/1980 | Starling | 43/1 |
| 5,169,079 | 12/1992 | Renzetti | 242/7.19 |
| 5,230,177 | 7/1993 | Hanley | 43/1 |

*Primary Examiner*—Kurt Rowan

[57] ABSTRACT

A vise for holding a fly fishing lure during construction and tying thereof. The inventive device includes a base member positionable upon a support surface. A support assembly projects upwardly from the base member and terminates in a clamping assembly which releasably engages a fly fishing lure to support the same in a position for tying thereof.

2 Claims, 4 Drawing Sheets

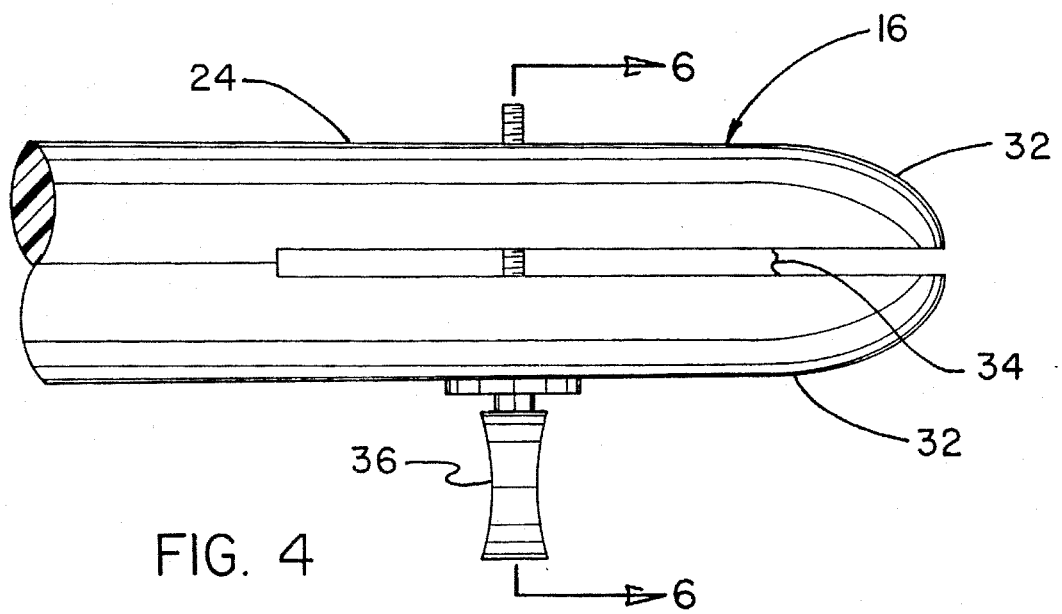
FIG. 4
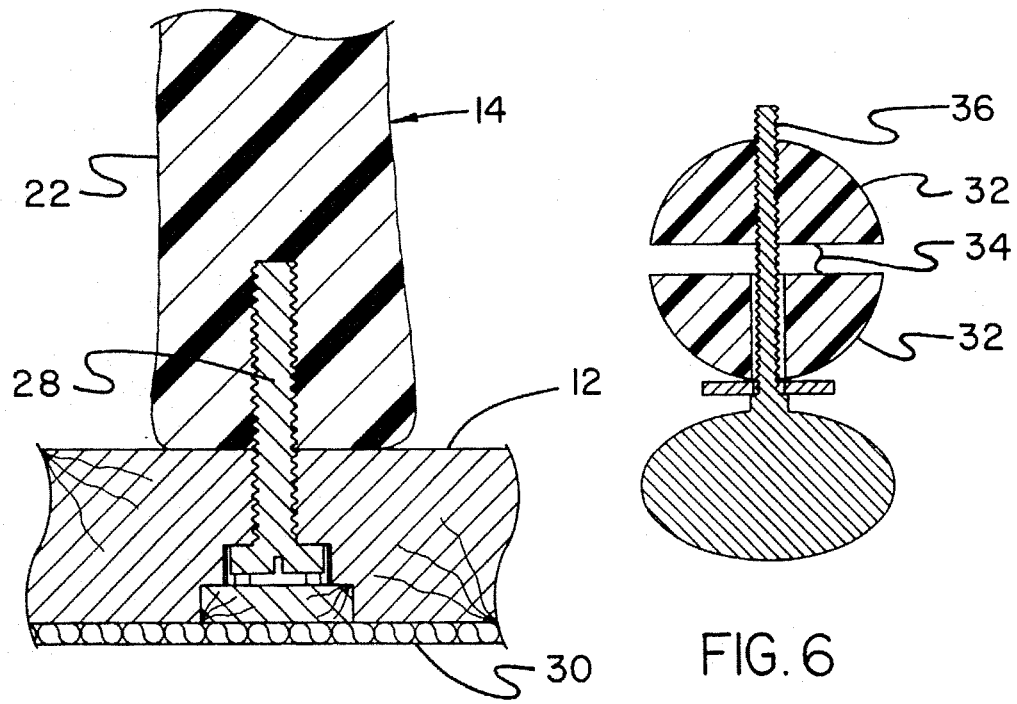
FIG. 5
FIG. 6

FLY TYING VISE

BACKGROUND OF THE INVENTION

1. Field of the Invention

The present invention relates to clamp structures and more particularly pertains to fly tying vise for holding a fly fishing lure during construction and tying thereof.

2. Description of the Prior Art

The use of clamp structures is known in the prior art. More specifically, clamp structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art clamp structures include U.S. Pat. Nos. 4,216,948; 5,050,176; 3,945,631; 3,287,263; and U.S. Pat. No. Des. 263,113.

While these devices fulfill their respective, particular objectives and requirements, the aforementioned patents do not disclose a fly tying vise for holding a fly fishing lure during construction and tying thereof which includes a base member positionable upon a support surface, and a support assembly projecting upwardly from the base member and terminating in a clamping assembly which releasably engages a fly fishing lure.

In these respects, the fly tying vise according to the present invention substantially departs from the conventional concepts and designs of the prior art, and in so doing provides an apparatus primarily developed for the purpose of holding a fly fishing lure during construction and tying thereof.

SUMMARY OF THE INVENTION

In view of the foregoing disadvantages inherent in the known types of clamp structures now present in the prior art, the present invention provides a new fly tying vise construction wherein the same can be utilized for holding a fly fishing lure in a spaced orientation relative to a support surface. As such, the general purpose of the present invention, which will be described subsequently in greater detail, is to provide a new fly tying vise apparatus and method which has many of the advantages of the clamp structures mentioned heretofore and many novel features that result in a fly tying vise which is not anticipated, rendered obvious, suggested, or even implied by any of the prior art clamp structures, either alone or in any combination thereof.

To attain this, the present invention generally comprises a vise for holding a fly fishing lure during construction and tying thereof. The inventive device includes a base member positionable upon a support surface. A support assembly projects upwardly from the base member and terminates in a clamping assembly which releasably engages a fly fishing lure to support the same in a position for tying thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly tying vise apparatus and method which has many of the advantages of the clamp structures mentioned heretofore and many novel features that result in a fly tying vise which is not anticipated, rendered obvious, suggested, or even implied by any of the prior art clamp structures, either alone or in any combination thereof.

It is another object of the present invention to provide a new fly tying vise which may be easily and efficiently manufactured and marketed.

It is a further object of the present invention to provide a new fly tying vise which is of a durable and reliable construction.

An even further object of the present invention is to provide a new fly tying vise which is susceptible of a low cost of manufacture with regard to both materials and labor, and which accordingly is then susceptible of low prices of sale to the consuming public, thereby making such fly tying vises economically available to the buying public.

Still yet another object of the present invention is to provide a new fly tying vise which provides in the apparatuses and methods of the prior art some of the advantages thereof, while simultaneously overcoming some of the disadvantages normally associated therewith.

Still another object of the present invention is to provide a new fly tying vise for holding a fly fishing lure during construction and tying thereof in a spaced orientation relative to a support surface.

Yet another object of the present invention is to provide a new fly tying vise which includes a base member positionable upon a support surface, and a support assembly projecting upwardly from the base member and terminating in a clamping assembly which releasably engages a fly fishing lure.

Even still another object of the present invention is to provide a new fly tying vise of the aforementioned structure which further includes a recess integrally formed into the base member and having a magnetic plate positioned therein for retaining metallic hooks, a writing instrument secured to the base member, and a clock means for obtaining the time of day positioned along the base member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a top plan view taken from line 4—4 of FIG. 2.

FIG. 5 is a cross-sectional view taken along line 5—5 of FIG. 3.

FIG. 6 is a further cross-sectional view taken along line 6—6 of FIG. 4.

DESCRIPTION OF THE PREFERRED EMBODIMENT

Figure 1:
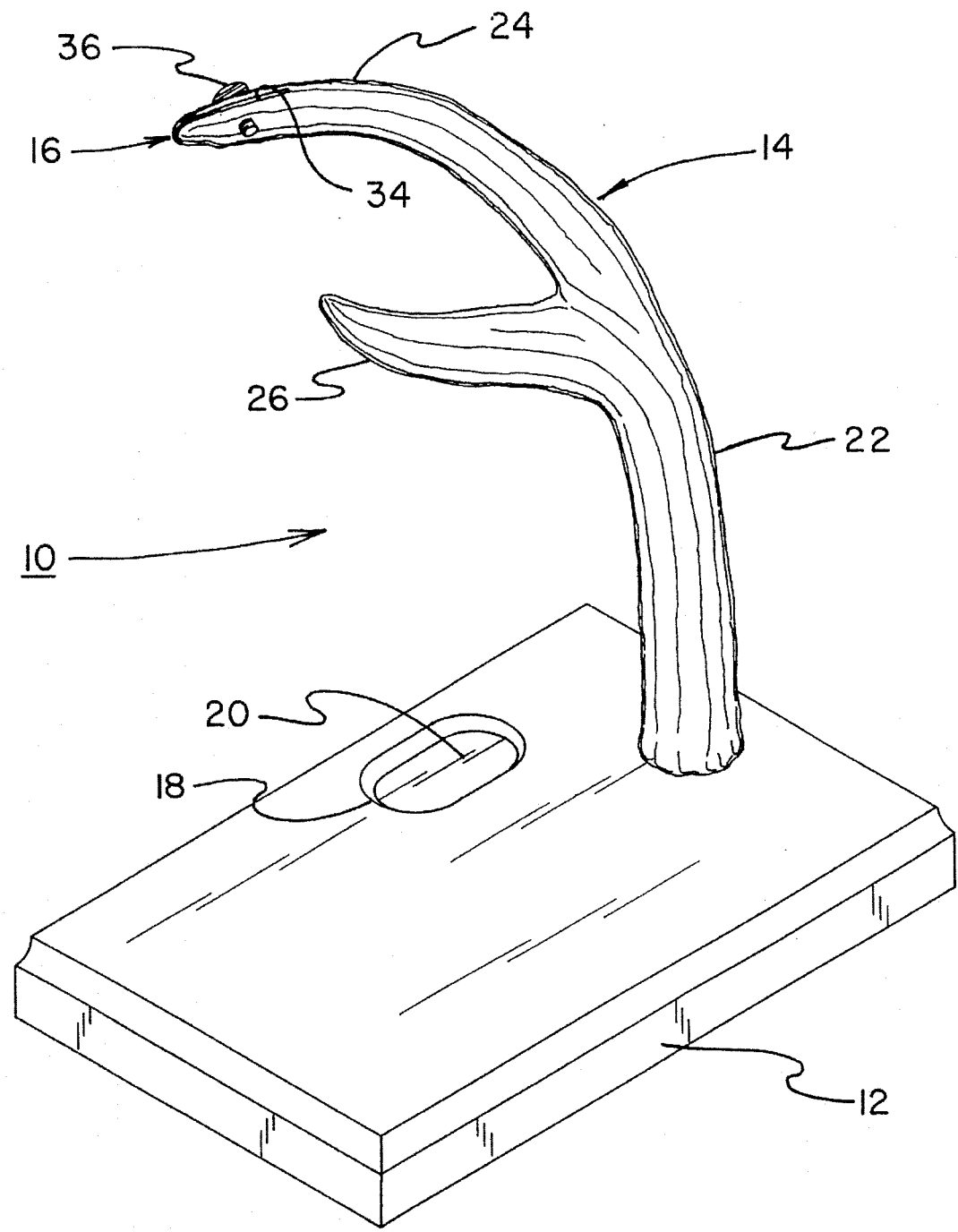
FIG. 1 is an isometric illustration of a fly tying vise according to the present invention.

With reference now to the drawings, and in particular to FIGS. 1–6 thereof, a new fly tying vise embodying the principles and concepts of the present invention and generally designated by the reference numeral 10 will be described.

More specifically, it will be noted that the fly tying vise 10 comprises a preferably rectangular base member 12 positionable upon an unillustrated support surface. A support means 14 extends upwardly from the base member 12 and is operable to support a clamping means 16 in a spaced orientation relative to the base member 12. The clamping means 16 can be utilized to releasably engage a portion of a fly fishing lure during construction and tying thereof. As shown in FIG. 1, the base member 12 is preferably shaped so as to define a recess 18 extending into a top surface thereof which may include a magnetic plate 20 extending along a bottom base of the recess 18 to magnetically retain metallic fishing hooks relative to the base member 12. Alternatively, the recess 18 may include a decorative fly fishing lure positioned therewithin and sealed beneath an acrylic clear plastic or the like.

As best shown in FIG. 1, the support means 14 preferably comprises a support stanchion 22 projecting upwardly from the base member 12 and secured thereto at a first longitudinal end thereof. The support stanchion 22 is preferably constructed from a section of animal antler and continues upwardly into a first limb member 24 having an outer distal end projecting substantially parallel relative to an upper surface of the base member 12 whereat the clamping means 16 is defined. Further, the support stanchion 22 continues from the base 12 and splits from the first limb member 24 into a second limb member 26 positioned vertically between the clamping means 16 and the base member 12. The second limb member 26 is operable to provide a surface upon which an individual's hand or the like may reside during construction and tying of a fly fishing lure engaged to the clamping means 16. As shown in FIG. 5, the support stanchion 22 of the support means 14 is secured to the base member 12 by a mounting fastener 28 extending through the base member 12 and threadably engaged to a lower end of the support stanchion 22. Further, the base member 12 may include a felt pad 30 extending along a bottom surface thereof so as to cushion an engagement of the base member 12 to the underlying support surface.

Figure 2:
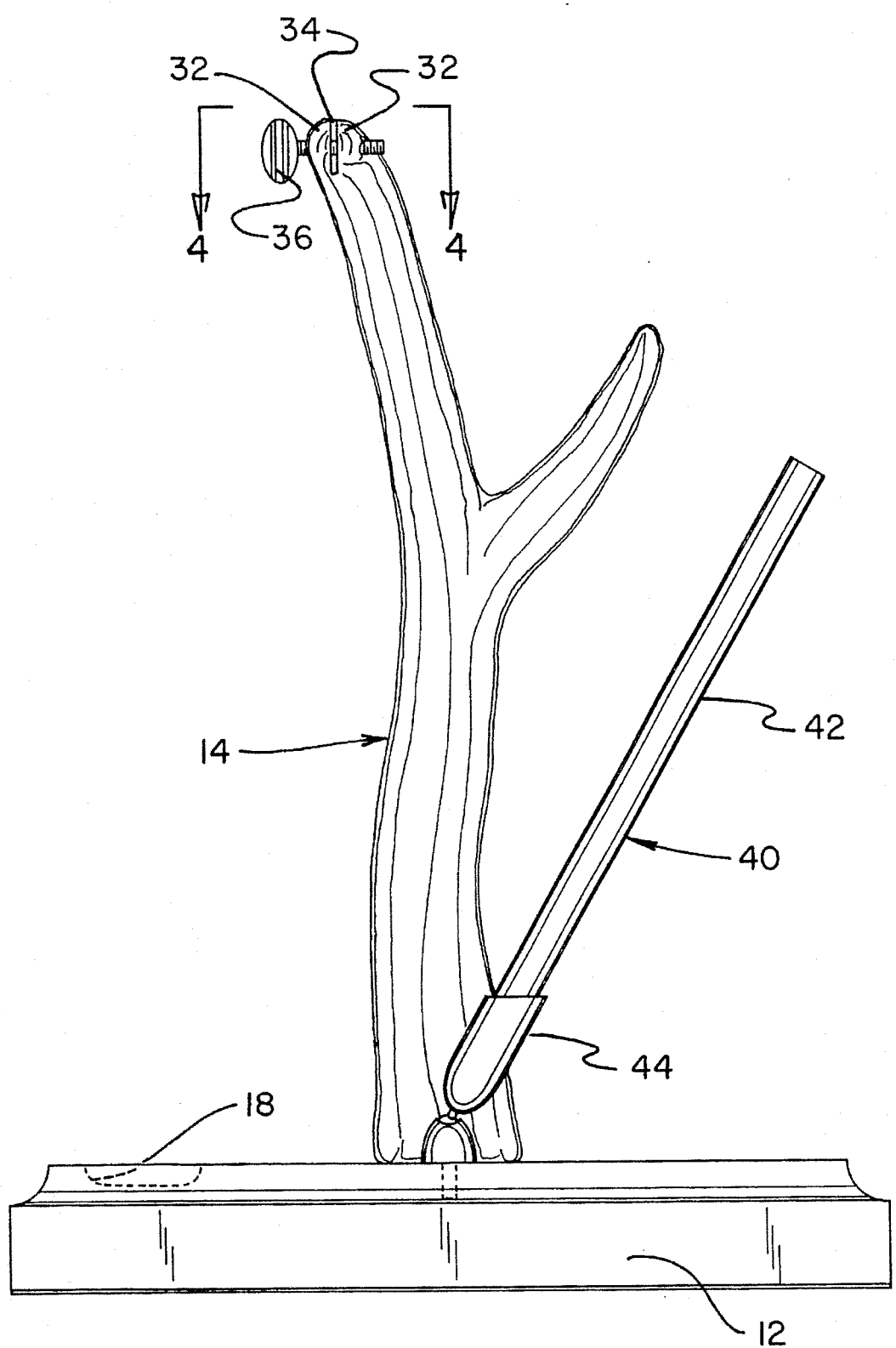
FIG. 2 is a front elevation view thereof.

As best illustrated in FIGS. 2, 4, and 6, the clamping means 16 preferably comprises a pair of spaced tip projections 32 extending from an upper distal end of the first limb member 24 and defined by an elongated slot 34 directed into the distal end of the first limb member. In other words, the elongated slot serves to separate the distal end of the limb member 24 into the two tip projections 32. Preferably, the elongated slot 34 is of a transverse width sufficient to receive a portion of a fishing hook therewithin. The clamping means 16, as shown in FIG. 4, further includes a clamping fastener 36 rotatably directed through a first one of the spaced tip projections 32 and threadably engaged to a second one of the spaced tip projections. By this structure, a rotation of the clamping fastener 36 will axially advance the clamping fastener to draw the spaced tip projections 32 towards one another and decrease the transverse width of the elongated slot 34, thereby clamping an object between the tip projections. Such clamping action of the spaced tip projections 32 can be utilized to engage and removably secure a fishing hook or the like of a fly fishing lure during construction and tying of the lure.

Figure 3:
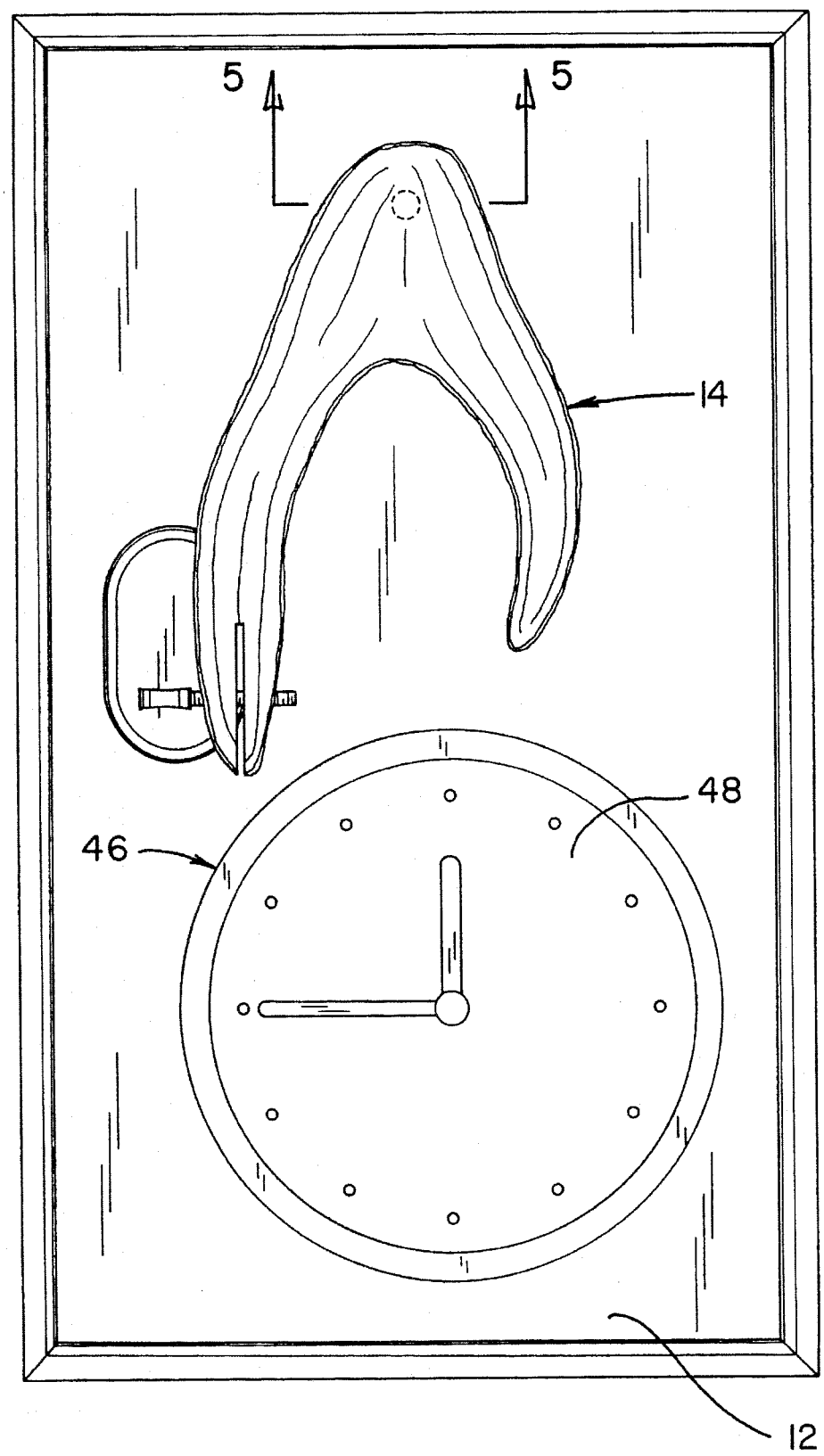
FIG. 3 is a top plan view of the present invention including a clock means.

Turning now to FIGS. 2 and 3, it can be shown that the present invention 10 may additionally include a writing instrument means 40 coupled to the base member 12 for marking and writing on a surface. To this end, the writing instrument means 40 preferably comprises a pen 42 removably engaged to a receptacle 44. The receptacle 44 is articulately mounted to the base member 12 and can be rotatably and pivotally moved relative thereto into a desired position.

As shown in FIG. 3, the base member 12 may, in lieu of the writing instrument means 40, include a clock means 46 for recording and visually communicating the time of day to an individual utilizing the device 10. To this end, the clock means 46 preferably comprises an analog clock 48 mounted to the base member 12. The analog clock 48 is useful to record the amount of time necessary to create an individual fly fishing lure during a tying competition or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fly tying vise comprising:

a base member positionable upon a support surface, said base member being shaped so as to define a recess extending into a top surface thereof;

a magnetic plate extending along a bottom base of said recess to magnetically retain metallic objects relative to said base member;

a clamping means for releasably engaging a portion of an object;

a support means extending upwardly from said base member for supporting said clamping means in a spaced orientation relative to said base member, said support means comprising a support stanchion projecting upwardly from said base member and secured thereto at a first longitudinal end of said support stanchion, said support stanchion continuing upward into a first limb member having an outer distal end projecting substantially parallel relative to an upper surface of said base member, said clamping means being coupled to a distal end of said first limb member, said support stanchion further splitting from said first limb member into a second limb member positioned between said clamping means and said base member, wherein said clamping means comprises a pair of spaced tip projections extending from said distal end of said first limb member, said tip projections being defined by an elongated slot directed into said distal end of said first limb member, wherein said elongated slot serves to separate said distal end of said limb member into said tip projections; and a clamping fastener rotatably directed through a first one of said spaced tip projections and threadably engaged to a second one of said spaced tip projections such that a rotation of said clamping fastener will axially advance said clamping fastener to draw said spaced tip projections towards one another and decrease a transverse width of said elongated slot to clamp said object between said tip projections; and, a writing instrument means coupled to said base member for marking and writing on a surface, said writing instrument means comprising a pen; and a receptacle articulately mounted to said base member, said pen being removably engaged to said receptacle.

2. A fly tying vise comprising:

a base member positionable upon a support surface, said base member being shaped so as to define a recess extending into a top surface thereof;

a magnetic plate extending along a bottom base of said recess to magnetically retain metallic objects relative to said base member;

a clamping means for releasably engaging a portion of an object;

a support means extending upwardly from said base member for supporting said clamping means in a spaced orientation relative to said base member, said support means comprising a support stanchion projecting upwardly from said base member and secured thereto at a first longitudinal end of said support stanchion, said support stanchion continuing upward into a first limb member having an outer distal end projecting substantially parallel relative to an upper surface of said base member, said clamping means being coupled to a distal end of said first limb member, said support stanchion further splitting from said first limb member into a second limb member positioned between said clamping means and said base member, wherein said clamping means comprises a pair of spaced tip projections extending from said distal end of said first limb member, said tip projections being defined by an elongated slot directed into said distal end of said first limb member, wherein said elongated slot serves to separate said distal end of said limb member into said tip projections; and a clamping fastener rotatably directed through a first one of said spaced tip projections and threadably engaged to a second one of said spaced tip projections such that a rotation of said clamping fastener will axially advance said clamping fastener to draw said spaced tip projections towards one another and decrease a transverse width of said elongated slot to clamp said object between said tip projections; and, a clock means mounted to said base member for recording and visually communicating a time of day, said clock means comprising an analog clock mounted to said base member.

* * * * *